Oct. 31, 1967 A. H. RICKLING 3,350,599
COLOR TELEVISION KINESCOPE ULTOR VOLTAGE REGULATOR UTILIZING A VOLTAGE DEPENDENT RESISTOR IN THE CONTROL GRID CIRCUIT OF THE REGULATOR TRIODE
Original Filed Oct. 3, 1963
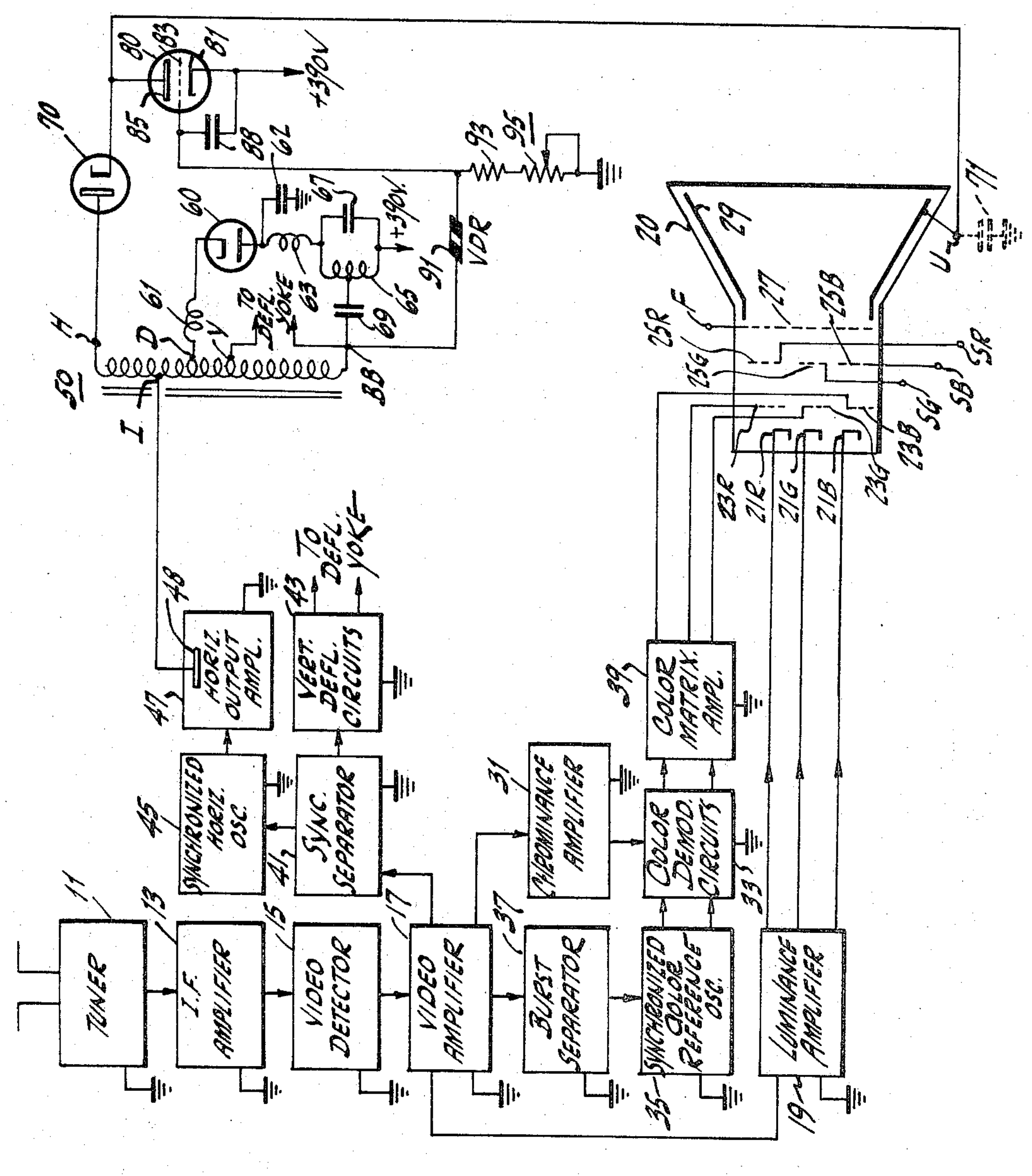
INVENTOR.
ALFRED H. RICKLING
BY
W. H. Sprouagle
Attorney United States Patent Office 3,350,599
Patented Oct. 31, 1967

3,350,599

COLOR TELEVISION KINESCOPE ULTOR VOLTAGE REGULATOR UTILIZING A VOLTAGE DEPENDENT RESISTOR IN THE CONTROL GRID CIRCUIT OF THE REGULATOR TRIODE

Alfred H. Rickling, West Lafayette, Ind., assignor to Radio Corporation of America, a corporation of Delaware Continuation of application Ser. No. 313,589, Oct. 3, 1963. This application Dec. 29, 1966, Ser. No. 605,935
8 Claims. (Cl. 315—22)

This application is a continuation of application No. 313,589 filed Oct. 3, 1963, now abandoned.

This invention relates generally to voltage regulators, and particularly to improvements in voltage supply regulator circuits of the typed used, for example, in conjunction with the high voltage supplies of color television receivers.

In a color television receiver, the usual color image reproducing device (e.g., the tri-gun, shadow mask color kinescope) requires a highly stabilized ultor or final accelerating voltage in order that its color selection functions are performed properly. The ultor voltage is conventionally derived by rectification of flyback pulses periodically developed across the windings of the receiver's horizontal output transformer. A well known scheme for effecting the desired high voltage regulation involves shunting of a regulator triode (i.e., its anode-cathode discharge current path) across the output terminals of the ultor supply; the regulator triode is thus effectively in parallel with the variable load presented by the color kinescope to the ultor supply. A voltage responsive to the undesired variations in the high voltage output of the ultor supply is applied between the control grid and cathode of the regulator triode in such polarity as to cause a change in the impedance presented by the regulator tube in a direction compensating for the load impedance variations. Thus, under dark picture conditions, when the kinescope load is high impedance and draws little or no current, the regulator triode presents a low impedance and draws a sizable current; conversely, under bright picture conditions, when the kinescope presents a low impedance and draws a sizable current, the regulator presents a high impedance, drawing little or no current.

The B-boost voltage, conventionally developed in television receivers by damper tube circuitry associated with the horizontal output transformer and operating in accordance with well known power recovery principles, provides a good sampling voltage source for regulator control, the B-boost voltage being a relatively low voltage (e.g. 750 volts) which is subject to variations that reflect the larger, undesired variations in the ultor supply output. Reference may be made to U.S. Patent No. 2,785,336, issued to John A. Konkel and John Stark, Jr. on Mar. 12, 1957, for a more detailed presentation of employment of the B-boost voltage sampling technique for high voltage regulator control purposes.

The RCA CTC–12 color television chassis, illustrated in the RCA Color Television Service Data pamphlet designated 1962 No. T6, is representative of a prior art high voltage regulator circuit employing B-boost sampling. In the illustrated circuit, the control grid of the regulator triode is connected to an intermediate point on a resistive voltage divider shunted across the receiver's B-boost voltage supply; the resistive divider consists of a pair of high value fixed resistors in series with a variable resistor, the latter having a maximum value which is small relative to the resistance value of each of the fixed resistors. With the regulator grid connected to the junction of the series connected fixed resistors, the effect of the divider is to divide the B-boost voltage substantially in half, subject to small departures from such a division ratio in accordance with the setting of the smaller variable resistor. The reason for this division of the B-boost voltage is to obtain a sample voltage falling in a range suitable for the desired grid control of the regulator. The regulator cathode is maintained at the potential of the receiver's B+ supply, which is roughly one-half of the usual B-boost voltage.

A disadvantage involved in the noted B-boost voltage division resides in the fact that those variations in the B-boost voltage which it is desired to sense and correct are also divided down in similar ratio. Thus, where the division is one-half for the purposes of grid operating point selection, an attenuation of effective loop gain of the regulator is introduced in the same one-half ratio.

The present invention is directed to an inexpensive modification of regulator circuits such as the described CTC–12 circuit whereby the voltage division necessary for grid operating point selection purposes can be effected while introducing a much smaller degree of attenuation of the regulator loop gain. Such desirable results are obtained in accordance with an embodiment of the present invention through the use of a voltage dependent resistor (VDR) as an element in the B-boost voltage divider. By substituting the VDR for a fixed resistor in the divider portion extending from the full B-boost voltage point to the regulator grid, a voltage divider is provided with a substantially decreased adverse effect on the regulator loop gain. Under dark picture conditions, when B-boost voltage is at its maximum, the resistance presented by the VDR will be relatively small, whereas, under bright picture conditions, when the B-boost voltage level is depressed, the resistance presented by the voltage dependent resistor will be relatively large. Thus, for a given range of B-boost voltage variation, the divider incorporating the VDR will present an appreciably wider range of control-grid to cathode voltage variations than would a voltage divider employing an appropriately valued fixed resistor in the place of the VDR. Accordingly, the regulator loop gain is higher in a circuit pursuant to the invention than obtainable in the prior art fixed resistor circuit.

The primary object of the present invention is to provide a novel and improved regulated voltage supply.

A further object of the present invention is to provide the shunt regulator circuitry associated with the ultor supply of a color television receiver with an improvement in loop gain over prior art circuits, whereby a higher degree of stabilization of ultor voltage and horizontal deflection than heretofore obtained may be readily and inexpensively realized.

Other objects and advantages of the present invention will be readily recognized by those skilled in the art upon reading of the following detailed description and an inspection of the accompanying drawing which illustrates in a diagram, partially block and partially schematic, color television receiver circuitry incorporating a regulated ultor supply in accordance with an embodiment of the present invention.

The color television receiver of the drawing is illustratively of the same general receiver form as the RCA CTC–12 color television receiver described in the previously mentioned service data pamphlet designated 1962 No. T6. Thus, the receiver incorporates a lineup of tuner 11, IF amplifier 13 and video detector 15, the tuner 11 selectively amplifying and converting to intermediate frequencies a radiated television signal, the IF amplifier 13 amplifying the intermediate frequency version of the radiated signal for delivery to the video detector 15, which recovers therefrom a composite video signal. The composite video signal output of detector 15 is supplied to a video amplifier 17, which delivers an amplified version of the composite signal to a plurality of channels in the color television receiver.

One of the outputs of the video amplifier 17 is supplied to a luminance amplifier 19, which delivers signals to the cathodes 21R, 21G, 21B of a tri-gun shadow mask color kinescope 20; the signals delivered to the kinescope cathodes control the brightness of the image reproduced on the screen of the kinescope 20.

Another output of the video amplifier 17 is applied to a chrominance amplifier 31, provided with bandpass characteristics for selectively amplifying the chrominance component (a modulated color subcarrier) of the composite video signal. The modulated color subcarrier output of amplifier 31 is synchronously detected in the color demodulation circuits 33 to produce a pair of color-difference signal outputs. The synchronous detection is achieved in the demodulator circuits 33 under the control of suitably phased outputs of a synchronized color reference oscillator 35, synchronization of the latter being achieved in response to the color synchronizing burst output of a burst separator 37; the burst separator 37 comprises a suitably time-gated device, responding to an ouptut of video amplifier 17 and selectively passing the burst of reference phase subcarrier frequency oscillations appearing on the back porch of the horizontal sync pulse in a composite color television signal.

The pair of color-difference signal outputs developed by the demodulator circuits 33 are passed to a color matrix amplifier 39, which suitably combines the delivered color-difference signals to develop a set of three color-difference signal outputs (e.g. of the well-known form R–R, G–Y and B–Y) suitable for application to the respective control grids 23R, 23G, and 23B of the multi-gun color kinescope 20, to control the coloring (hue and saturation) of the image reproduced on the screen of the kinescope 20.

Additional operating electrodes of the color kinescope 20 include respective screen grid electrodes 25R, 25G and 25B, energized with respectively adjustable DC potentials at terminals $S_R$, $S_G$ and $S_B$; a focusing electrode structure 27, serving to focus the three beams of the kinescope 20, and energized at terminal F with a suitably adjustable DC focusing potential; and a final accelerating or ultor electrode 29, in its usual form including a conductive coating on the inner surface of the bulb portion of the kinescope 20 envelope. The ultor electrode energizing terminal U is supplied with a suitably regulated high voltage from circuitry to be subsequently described.

An additional output of the video amplifier 17 is supplied to a sync separator 41, which serves to separate the deflection synchronizing components from the remainder of the composite video signal. The sync separator 41 delivers a synchronizing component to the vertical deflection circuits 43 to synchronize the development in the latter of an appropriate scanning waveform for application to the vertical windings of the kinescope's deflection yoke (not illustrated). The sync separator 41 also delivers a separated synchronizing component to the synchronized horizontal oscillator 45 to synchronize the development therein of a line frequency waveform suitable for application to a horizontal output amplifier 47. The output amplifier 47 supplies a line scanning current to the horizontal windings of the deflection yoke via a horizontal output transformer 50.

Output transformer 50 provides step-down autotransformer coupling between the output electrode 48 of amplifier 47 and the horizontal windings of the deflection yoke; the transformer 50 also provides step-up autotransformer action for delivering flyback pulses of augmented amplitude to the high voltage rectifier, diode 70. The primary winding of transformer 50 extends between an end terminal BB and an intermediate input terminal I (to which output electrode 4 is directly connected). The deflection yoke windings are coupled across a transformer secondary winding section defined by end terminal BB and an intermediate tap Y (between input terminal I and end terminal BB). An additional tap D is located on the primary winding section of transformer 50 between the input terminal I and the yoke connection tap Y; damper diode 60 has its cathode electrode coupled via choke 61 to the tap D. The anode of damper diode 60 is coupled via a choke 63 in series with an adjustable linearity or efficiency controlling inductor 65 to the B+ supply of the receiver. The inductor 65 is shunted by a capacitor 67, and a capacitor 69 is coupled between an intermediate tap on inductor 65 and the transformer end terminal BB. The damper diode serves conventional reaction scanning and power recovery purposes. Periodic conduction of the damper diode 60 develops a charge across the capacitor 69 which adds to the B+ supply potential to provide at terminal BB a so-called B-boost voltage, which thereupon constitutes a supply voltage of augmented amplitude.

The high potential end terminal H of the transformer 50 is directly connected to the anode of the high voltage rectifier diode 70. The cathode of diode 70 is directly connected to the energizing terminal (U) for the ultor electrode 29 of color kinescope 20. A high voltage filter capacitor 71 appears between the ultor electrode and chassis ground; this capacitor is generally constituted by the capacity inherently provided between the inner conductive coating of the kinescope 20 bulb that is a constituent of the ultor electrode 29, and a conductive coating on the outer surface of the kinescope 20 bulb, which coating is conventionally grounded to the chassis.

Regulation of the high voltage output of rectifier 70 is effected through the use of a regulator triode 80. The anode 85 of regulator triode 80 is directly connected to the cathode of diode 70, while the cathode 81 of regulator triode 80 is returned to the receiver's B+ supply. The control grid 83 of regulator triode 80 is bypassed to the cathode 81 for video signal frequencies by a capacitor 88.

A control voltage is supplied to the control grid 83 of triode 80 to vary the conductivity of triode 80 in accordance with variations in the high voltage output of rectifier 70. Such output variations can be anticipated in operation of the illustrated receiver due to the widely variable load that the kinescope 20 presents to the high voltage supply. The DC component of the output of luminance amplifier 19, which, as noted previously, controls the brightness of the image displayed on the screen of the kinescope 20, varies with the content of the picture to be displayed. For dark displays, the average current flowing from the respective kinescope cathodes 21R, 21G and 21B to the common ultor electrode 29 is small, and the kinescope appears as a relatively high impedance to the ultor supply driving it. However, for brighter scenes the average kinescope current substantially increases, lowering the impedance presented by the kinescope to the supply, and tending to depress the level of the supply's output voltage.

It is desired that the regulator triode should compensate for this tendency of the output voltage to decrease by becoming less conductive and presenting a higher impedance under such brightening picture conditions. Conversely, when the picture darkens, it is desired that the regulator conduction increase.

The B-boost voltage, developed in the power recovery operation of the damper diode 60, has been found to be a voltage that tends to track with the ultor supply output variations. The reason for this tracking is that the kinescope load variations change the loading on the output transformer and thereby alter the voltage swing of the free oscillation in the output transformer circuit that is initiated during each retrace period, producing the so-called flyback pulse during its first half cycle, and inducing damper conduction on commencement of its second half cycle. The B-boost voltage, determined by the charge on the B-boost capacitor as developed by damper conduction in the course of damping the noted free oscillation, is accordingly affected.

The B-boost voltage is in a more convenient voltage range (around 750 volts) for control use than the high voltage output itself (which is of the order of 24,000 volts). Accordingly, it has been suggested in the past that the B-boost voltage should be sampled to obtain the grid input voltage for the regulator triode. A novel form of such sampling is effected in the illustrated circuit by use of a voltage dividing network comprising the series combination of a voltage dependent resistor (VDR) 91, a fixed resistor 93 and a variable resistor 95; the series combination of these resistors is connected between end terminal BB of the output transformer 50 and chassis ground. The junction between VDR 91 and fixed resistor 93 is directly connected to the control grid 83 of regulator triode 80.

The voltage divider network 91–93–95 divides down the B-boost voltage to provide a resultant voltage level at control grid 83 that is in a suitable operating point range with regard to the potential of the B+ connected to cathode 81. The voltage division ratio of the network 91–93–95 can be manually adjusted to a small degree through adjustment of the variable resistor 95 (which is relatively small in resistance value in comparison with the elements 91 and 93). However, for any selected adjustment of resistor 95, a fixed voltage division ratio is not established at the control grid 83, but, rather, a variable voltage division ratio is established, which varies with the level of the B-boost votlage at the terminal BB. This variation in division ratio is due to the characteristic of the VDR 91, which increases in resistance value as the B-boost voltage decreases. The effect of this change in voltage division ratio is a very salutary one: the variations in the B-boost voltage suffer relatively little attenuation in the voltage division network.

Stated from another view, the characteristics of the VDR 91 are such as to maintain a relatively constant voltage drop across it as the B-boost voltage varies. With this tendency to maintain a relatively constant voltage across the VDR portion of the voltage divider network, it will be seen that substantially all of the variations in the voltage across the full network must appear across the ("voltage independent") remainder of the voltage divider network (i.e. between the regulator grid and chassis ground). Thus, the B-boost voltage variations are effectively repeated in a lower voltage range at the regulator grid, suffering relatively little attenuation in the votlage division network.

In the use of a circuit as shown in the drawing in a color television receiver of the aforementioned RCA CTC–12 type, deviation of the high voltage rectifier output from a zero-kinescope-current value of 24,000 volts has been limited to 1.9 percent over a kinescope current range from zero to one milliampere, in contrast to deviations of the order of 3.1 percent observed with B-boost voltage divider networks employing solely constant resistance type (i.e., voltage independent) resistors. Excellent high voltage stability in the face of wide variations in B+ potential (e.g., power line fluctuations) has also been observed in use of the disclosed regulator arrangement. Horizontal deflection variations are also reduced.

By way of example, the following table of parameter values for the illustrated circuit is presented, the set of values have proved satisfactory in providing high voltage regulation of the noted order in a receiver of the noted type; it will be appreciated that the present invention is in no way limited to such specific parameter values:

| | |
|---|---|
| Resistor **93** | 1.2 megohm. |
| Resistor **95** | 0–500,000 ohms. |
| VDR **91** | 1.2 megohm at 400 v.; 500,000 ohms at 500 v. |
| Capacitor **62** | 22 micromicrofarads. |
| Capacitor **67** | .15 microfarad. |
| Capacitor **69** | .12 microfarad. |
| Capacitor **88** | 3300 micromicrofarads. |
| Chokes **61, 63** | 5.6 microhenries (each). |
| Coil **65** | RCA Stock No. 112875. |
| Diode **60** | 6DW4. |
| Diode **70** | 3A3. |
| Triode **80** | 6BK4. |

What is claimed is:

1. In a color television receiver including a color image reproducing device having an ultor electrode, a high voltage rectifier having an output electrode connected to said ultor electrode for supplying an energizing potential thereto, a source of reference potential, and a regulator device having a control electrode for altering the conductivity of a current path in said device, said current path being connected between said rectifier output electrode and said source of reference potential, the combination comprising:
   - a source of control voltage appreciably smaller in magnitude than said energizing potential but significantly greater in magnitude than said reference potential, said control voltage being responsive to and reflective of variations in the amplitude of said energizing potential;
   - a voltage divider network comprising a first resistance-exhibiting portion and a second resistance-exhibiting portion connected in series in the order named between said control voltage source and a point of substantially unvarying potential, said first resistance-exhibiting portion varying in exhibited resistance inversely with respect to variations of said control voltage amplitude, the resistance of said second resistance-exhibiting portion being substantially invariant with respect to variations of said control voltage amplitude;
   - and means for connecting said regulator device control electrode to the junction of said first and second resistance-exhibiting portions of said voltage divider network.

2. A regulated high voltage supply comprising, in combination:
   - a source of alternating current energy;
   - a rectifier having an output electrode and coupled to said source for developing a high voltage output at said output electrode;
   - a variable impedance load coupled between said output electrode and a point of reference potential;
   - a regulating device having a control electrode;
   - means for effectively shunting said regulating device across said variable impedance load;
   - means for developing a control voltage representative in amplitude of any variations in the amplitude of the high voltage output of said rectifier;
   - a first resistance means, the resistance of said first resistance means being substantially insensitive to variations in voltage applied thereacross;
   - a second resistance means which exhibits variations in its resistance in inverse relation to variations in voltage applied thereacross;
   - means for connecting said first resistance means between said control electrode of said regulating device and said point of reference potential;
   - and means for connecting said second resistance means between said control voltage developing means and said regulating device control electrode.

3. In a color television receiver including a color kinescope having an ultor electrode, a high voltage rectifier having an output electrode connected to said ultor electrode for supplying an energizing potential thereto, a source of B+ potential, and a regulator triode having cathode, control grid and anode electrodes, the anode-cathode current path of said triode being connected between said rectifier output electrode and said source of B+ potential, the combination comprising:
   - a source of B-boost voltage responsive to variations in the amplitude of said energizing potential;
   - a voltage divider network comprising a first resistance-exhibiting portion and a second resistance-exhibiting portion connected in series in the order named between said B-boost voltage source and a point of substantially unvarying potential, said first resistance-exhibiting portion comprising a voltage dependent resistor varying in exhibited resistance inversely with respect to variations of said B-boost voltage amplitude, and the resistance of said second resistance-exhibiting portion being substantially invariant with respect to variations of said B-boost voltage amplitude;

and means for connecting said regulator device control electrode to the junction of said first and second resistance-exhibiting portions of said voltage divider network.

4. In a television receiver, a regulated high voltage supply comprising, in combination:

a flyback transformer;

a rectifier having an output electrode, said rectifier being coupled to said flyback transformer for developing a high voltage output at said output electrode;

a variable impedance load coupled between said output electrode and a point of reference potential;

a regulating device having a control electrode;

means for effectively shunting said regulating device across said variable impedance load;

power recovery means coupled to said flyback transformer for developing a control voltage representative in amplitude of any variations in the amplitude of the high voltage output of said rectifier;

a first resistance means, the resistance of said first resistance means being substantially insensitive to variations in voltage applied thereacross;

a second resistance means which exhibits variations in its resistance in inverse relation to variations in voltage applied thereacross;

means for connecting said first resistance means between said control electrode of said regulating device and said point of fixed potential;

and means for connecting said second resistance means between said control voltage developing means and said regulating device control electrode.

5. In a color television receiver including a color kinescope having an ultor electrode, a high voltage rectifier having an output electrode connected to said ultor electrode for supplying an energizing potential thereto, a source of B+ potential, and a regulator triode having cathode, control grid and anode electrodes, the anode-cathode current path of said triode being connected between said rectifier output electrode and said source of B+ potential, the combination comprising:

a source of B-boost voltage responsive to variations in the amplitude of said energizing potential;

a voltage divider network comprising a first resistance-exhibiting portion and a second resistance-exhibiting portion connected in series in the order named between said control voltage source and a point of substantially unvarying potential, said first resistance-exhibiting portion comprising a voltage dependent resistor varying in exhibited resistance inversely with respect to variations of said control voltage amplitude, and said second resistance-exhibiting portion comprising the series combination of a pair of voltage independent resistors, one of said pair of voltage independent resistors being subject to manual adjustment of its resistance value;

and means for connecting said regulator device control electrode to be the junction of said first and second resistance-exhibiting portions of said voltage divider network.

6. In a color television receiver including a color image reproducing device having an ultor electrode, a high voltage rectifier having an output electrode connected to said ultor electrode for supplying an energizing potential thereto, a source of reference potential, and voltage regulating means including a regulator device having input, output and common electrodes, the conductivity of the current path presented by said device between said output and common electrodes varying in accordance with the potential difference between the potentials of said input and common electrodes, said regulating means utilizing variations in the conductivity of said current path to oppose changes in the amplitude of said energizing potential, a control arrangement for said regulator device comprising, in combination:

means for applying said reference potential to said common electrode;

a source of control voltage appreciably smaller in magnitude than said energizing potential but significantly greater in magnitude than said reference potential, said control voltage being responsive to and reflective of variations in the amplitude of said energizing potential;

a voltage divider network comprising a first resistance-exhibiting portion and a second resistance-exhibiting portion connected in series in the order named between said control voltage source and a point of substantially unvarying potential, said first resistance-exhibiting portion varying in exhibited resistance inversely with respect to variations of said control voltage amplitude, the resistance of said second resistance-exhibiting portion being substantially invariant with respect to variations of said control voltage amplitude;

and means for connecting said regulator device input electrode to the junction of said first and second resistance-exhibiting portions of said voltage divider network.

7. In a television receiver including a source of B+ potential, a regulated high voltage supply comprising, in combination:

a flyback transformer;

a rectifier having an output electrode, said rectifier being coupled to said flyback transformer for developing a high voltage output at said output electrode;

a regulating device having cathode, control grid and anode electrodes;

means for connecting said cathode to said source of B+ potential;

power recovery means coupled to said flyback transformer for developing a B-boost voltage subject to amplitude alterations in response to variations in the amplitude of the high voltage output of said rectifier;

a first resistance means, the resistance of said first resistance means being substantially insensitive to variations in voltage applied thereacross;

a second resistance means which exhibits variations in its resistance in inverse relation to variations in voltage applied thereacross;

means for connecting said first resistance means between said control electrode of said regulating device and a point of fixed potential;

means for connecting said second resistance means between said control voltage developing means and said regulating device control electrode;

and means for utilizing variations in the impedance presented between said anode and cathode electrodes of said regulating device as said B-boost voltage amplitude alters to oppose said variations in the amplitude of said high voltage output.

8. A regulated high voltage supply in accordance with claim 7 wherein said regulating device is effectively shunted across the high voltage output of said supply, said regulating device anode being connected to said rectifier output electrode.

No references cited.

JOHN W. CALDWELL, *Primary Examiner.*

R. K. ECKERT, Jr., *Assistant Examiner.*

UNITED STATES PATENT OFFICE

CERTIFICATE OF CORRECTION

Patent No. 3,350,599 October 31, 1967

Alfred H. Rickling

It is hereby certified that error appears in the above numbered patent requiring correction and that the said Letters Patent should read as corrected below.

Column 3, line 33, for "R-R" read -- R-Y --; line 74, for "electrode 4" read -- electrode 48 --.

Signed and sealed this 11th day of February 1969.

(SEAL)
Attest:

Edward M. Fletcher, Jr.
Attesting Officer

EDWARD J. BRENNER
Commissioner of Patents